(12) United States Patent
Jibbe et al.

(10) Patent No.: US 9,830,094 B2
(45) Date of Patent: Nov. 28, 2017

(54) DYNAMIC TRANSITIONING OF PROTECTION INFORMATION IN ARRAY SYSTEMS

(71) Applicant: NetApp, Inc., Sunnyvale, CA (US)

(72) Inventors: Mahmoud K. Jibbe, Wichita, KS (US); Charles D. Binford, Wichita, KS (US); Wei Sun, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 31 days.

(21) Appl. No.: 14/746,938

(22) Filed: Jun. 23, 2015

(65) Prior Publication Data

US 2016/0378363 A1 Dec. 29, 2016

(51) Int. Cl.
*G06F 12/00* (2006.01)
*G06F 13/00* (2006.01)
*G06F 13/28* (2006.01)
*G06F 3/06* (2006.01)
*G06F 12/0875* (2016.01)

(52) U.S. Cl.
CPC .......... *G06F 3/0619* (2013.01); *G06F 3/0665* (2013.01); *G06F 3/0689* (2013.01); *G06F 12/0875* (2013.01); *G06F 2212/452* (2013.01)

(58) Field of Classification Search
CPC .. G06F 12/14; G06F 12/1458; G06F 12/1425; G06F 12/0875; G06F 21/00; G06F 21/62; G06F 21/6209; G06F 21/6218; G06F 21/30; G06F 21/31; G06F 21/33; G06F 3/0619; G06F 3/062; G06F 3/0622; G06F 3/0623; G06F 3/064; G06F 3/0665; G06F 3/0689; G06F 2212/452; G06F 2212/46; G06F 2212/461; G06F 2212/2107

USPC .............. 711/114, 154, 163, 164, 102, 103; 713/164–167; 726/26–30
See application file for complete search history.

(56) References Cited

U.S. PATENT DOCUMENTS

| | | | | |
|---|---|---|---|---|
| 2011/0225359 A1* | 9/2011 | Kulkarni | ............... | G06F 3/0607 711/114 |
| 2011/0307658 A1* | 12/2011 | Miwa | .................... | G06F 3/0605 711/114 |
| 2013/0054918 A1* | 2/2013 | Banzhaf | .............. | G06F 11/1076 711/163 |
| 2013/0160141 A1* | 6/2013 | Tseng | .................. | G06F 21/6245 726/28 |

(Continued)

*Primary Examiner* — Sanjiv Shah
*Assistant Examiner* — Shane Woolwine
(74) *Attorney, Agent, or Firm* — Haynes and Boone, LLP (57) ABSTRACT

A system, method, and computer program product is described for providing dynamic enabling and/or disabling of protection information (PI) in array systems during operation. A storage system receives a request to transition a volume from PI disabled to PI enabled during regular operation. The storage system synchronizes and purges the cache associated with the target volume. The storage system initiates an immediate availability format (IAF-PI) process to initialize PI for the associated data blocks of the volume's storage devices. The storage system continues receiving I/O requests as the IAF-PI process sweeps through the storage devices. The storage system inserts and checks PI for the write data as it is written to the storage devices. The storage system inserts PI for requested data above the IAF-PI boundary and checks PI for requested data below the IAF-PI boundary. The transition remains an online process that avoids downtime.

18 Claims, 4 Drawing Sheets

(56) References Cited

U.S. PATENT DOCUMENTS

2014/0006898 A1* 1/2014 Sharon ............... H03M 13/356
714/755

* cited by examiner

DYNAMIC TRANSITIONING OF PROTECTION INFORMATION IN ARRAY SYSTEMS

TECHNICAL FIELD

The present description relates to data storage and, more specifically, to systems, methods, and machine-readable media for the dynamic enabling and/or disabling of protection information in array systems during their operation cycles.

BACKGROUND

A storage volume may include a grouping of data of any arbitrary size that is presented to a user as a single, unitary storage area regardless of the number of storage devices the volume actually spans. Typically, a storage volume utilizes some form of data redundancy, such as by being provisioned from a redundant array of independent disks (RAID) or a disk pool. A storage system may have multiple storage volumes for storing the data of one or more hosts (either local or remote). Sometimes, as data is transmitted between a host and the storage system, the data may become corrupted due to any number of factors including hardware error, software error, noise, and interference. To combat this potential corruption of data, protection information is used. Protection information may include error checking information that is generated for data blocks of a set of data, such as a cyclic redundancy check (CRC). The protection information is appended by a host or other device to the data blocks of the data set and then transmitted. Along the transmission path, various elements along the path may compare the data block to the appended protection information.

In order to utilize protection information, the storage devices supporting the volume should be capable of supporting protection information (in storage and transmission to/from the storage devices). At times, a user of the storage system may either want to disable protection information or enable protection information. To do so, however, the user first backs up data for the affected volume(s), deletes the current configuration for the volume(s), rebuilds the configuration to either enable or disable protection information (depending on the desired outcome), and then restores the backed up data. This is time consuming, causes undesirable downtime, and is burdensome for the user to complete.

Accordingly, the potential remains for improvements that, for example, result in a storage system that may dynamically switch between enabling and disabling protection information for capable volumes without requiring downtime.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for improving the operation of storage array systems by providing for the dynamic enabling and/or disabling of protection information in array systems during their operation cycles. In an embodiment, a user may request that a storage array system transition a volume from being PI disabled to PI enabled during regular operation (while the storage array system remains online), for example where the storage devices that comprise the volume are PI-capable. In response, the storage array system synchronizes and purges one or more caches that are associated with the target volume so that PI data may be included with data in the cache. To enable PI with the storage devices, the storage array system may initiate an internal reconstruction function, for example referred to as an immediate availability format (IAF-PI) process to initialize PI for the associated data blocks of the storage devices. As the IAF-PI process sweeps through the address ranges, the storage array system may continue receiving I/O requests from one or more hosts, thus avoiding downtime as the transition occurs.

For write requests, the storage array system may check the PI data by one or more input/output controllers before writing to the storage devices. If the write is to a location at or above the current IAF-PI boundary (e.g., where the IAF-PI process has not occurred yet), the write may be a full stripe write while writes to locations below the boundary may update the data, parity, and PI impacted by that write.

For read requests, if the target location is at or above the IAF-PI boundary, then the storage array system inserts PI data as the requested data is read from storage. This data, with the inserted PI data, is then cached in the previously purged cache. If the target location is below the IAF-PI boundary, then the storage array system checks the PI data as the requested data is read from storage. The requested data and PI data may be stored in the cache before being sent on as well. Under either embodiment, as the data with PI data leaves the cache, an Input Output Controller (IOC) may check or strip the PI data. For example, if the requesting host had requested that PI be included with the data, then the IOC may check the PI against the data one more time before sending to the host. If the requesting host had not requested PI with the data, then the IOC may strip the PI before sending the data on to the host. By utilizing the IAF-PI process and handling conditions, the process of transitioning between PI states (e.g., disabled to enabled) may remain a faster, online process that does not require downtime (such as to back up data and restore the data offline as previously done). As a result, the operation of the storage array system is improved with more efficient transitioning that minimizes or eliminates downtime related to PI enable and disable.

Figure 1:
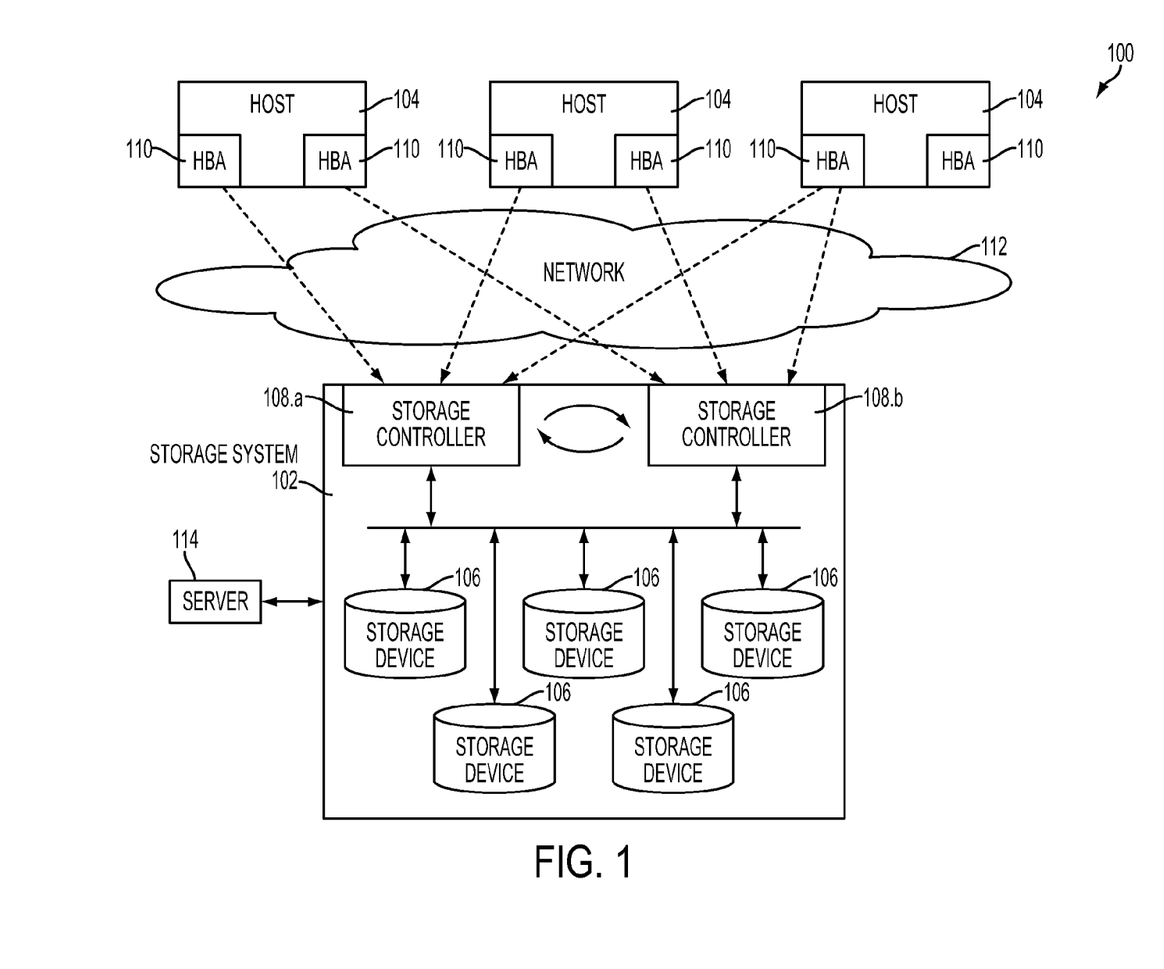
FIG. 1 is an organizational diagram of an exemplary data storage architecture according to aspects of the present disclosure.

A data storage architecture 100 is described with reference to FIG. 1. The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to read and/or write data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 and responds to one or more hosts 104's data transactions so that the storage devices 106 appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, it is also common for the storage system 102 to include a heterogeneous set of storage devices 106 that includes storage devices of different media types from different manufacturers with notably different performance.

The storage system 102 may group the storage devices 106 for speed and/or redundancy using a virtualization technique such as RAID (Redundant Array of Independent/Inexpensive Disks). The storage system may also arrange the storage devices 106 hierarchically for improved performance by including a large pool of relatively slow storage devices and one or more caches (i.e., smaller memory pools typically utilizing faster storage media). Portions of the address space may be mapped to the cache so that transactions directed to mapped addresses can be serviced using the cache. Accordingly, the larger and slower memory pool is accessed less frequently and in the background. In an embodiment, a storage device includes HDDs, while an associated cache includes SSDs.

In an embodiment, the storage system 102 may group the storage devices 106 using a dynamic disk pool virtualization technique. In a dynamic disk pool, volume data, protection information, and spare capacity are distributed across each of the storage devices included in the pool. As a result, each of the storage devices in the dynamic disk pool remain active, and spare capacity on any given storage device is available to each of the volumes existing in the dynamic disk pool. Each storage device in the disk pool is logically divided up into one or more data extents at various logical block addresses (LBAs) of the storage device. A data extent is assigned to a particular data stripe of a volume. An assigned data extent becomes a "data piece," and each data stripe has a plurality of data pieces, for example sufficient for a desired amount of storage capacity for the volume and a desired amount of redundancy, e.g. RAID 5 or RAID 6. As a result, each data stripe appears as a mini RAID volume, and each logical volume in the disk pool is typically composed of multiple data stripes.

The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; as will be recognized, more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

For example, the storage system 102 is communicatively coupled to server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size.

With respect to the hosts 104, a host 104 includes any computing resource that is operable to exchange data with a storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. The HBAs 110 of the hosts 104 may be coupled to the storage system 102 by a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., read, write, modify, etc.) remote data, a host HBA 110 sends one or more data transactions to the storage system 102. Data transactions are requests to read, write, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by reading, writing, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a Wide Area Network (WAN), and/or a Local Area Network (LAN). Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system that responds to file-level transactions. It is understood that the scope of present disclosure is not limited to either block-level or file-level protocols, and in many embodiments, the storage system 102 is responsive to a number of different memory transaction protocols.

In an embodiment, the server 114 may also provide data transactions to the storage system 102. Further, the server 114 may be used to configure various aspects of the storage system 102, for example under the direction and input of a user. Some configuration aspects may include definition of RAID group(s), disk pool(s), and volume(s), to name just a few examples.

According to embodiments of the present disclosure, the server 114 may also send a request to the storage system 102 to either enable or disable protection information (PI) for one or more specified volumes. PI, generally, refers to error checking information that may be appended to data blocks. This may be in the form of a cyclic redundancy check (CRC), for example. The one or more specified volumes are volumes, for example part of a volume group, composed of one or more storage devices 106 that are PI-capable. For example, a PI-capable storage device 106 may be one that has been formatted with byte sectors large enough to accommodate PI for each data block, such as 520 byte sectors instead of 512 byte sectors, so that 8 bytes of protection information may be generated for every 512 bytes. The size of the sectors and/or the protection information is exemplary only. The storage devices 106 may be formatted to any of a variety of PI types, as will be recognized (e.g., Type 0, Type 1, Type 2, Type 3 to name some examples). The bytes formatted for PI may include the CRC (or other value) as well as one or more other tag fields (e.g., block application tag and/or block reference tag). As a result of having PI capable storage devices 106 combined for a volume, the entire volume may be PI-capable.

In response to the request from the server 114 to enable or disable PI, the storage system 102 may take the necessary action in response while regular operations (e.g., I/O requests from hosts 104) continue. This involves, for either transitioning from disabled to enabled status or from enabled to disabled status, synchronizing and purging a cache associated with the specified volume. In embodiments where the request is a transition from disabled to enabled PI status, at least one of the storage controllers 108.a, 108.b may initiate an Immediate Availability Feature (IAF-PI) that includes an internal reconstruction operation that initializes/updates PI for every data block within the designated range. For example, the IAF-PI process is a background initialization process that reads data blocks in uninitialized regions (such as striped data), calculates various information (such as the PI for the data blocks and, where appropriate, parity information), and then stores the information in appropriate locations on the storage devices 106. The IAF-PI process may begin at a lowest LBA for an LBA range of a selected storage device 106 and then sequentially work through the LBAs of the storage device 106 until it reaches the end of the LBA range. This may be referred to as "sweeping through" the storage devices 106. While the IAF-PI is sweeping through the storage devices 106 associated with the specified volume, I/O requests to/from the specified volume may be treated according to whether they fall above or below the boundary of the IAF-PI process for the given moment in time, as will be discussed in more detail below with respect to FIG. 3.

As data associated with I/O requests transits between a requesting host 104 and the one or more associated storage devices 106 of storage system 102, one or more elements along the data path may check the PI of the data to confirm the integrity of the data before passing the data on. The storage system 102 may include multiple hardware and/or software components that may be utilized for this checking and other operations associated with PI, as explained further below with respect to FIG. 2.

Figure 2:
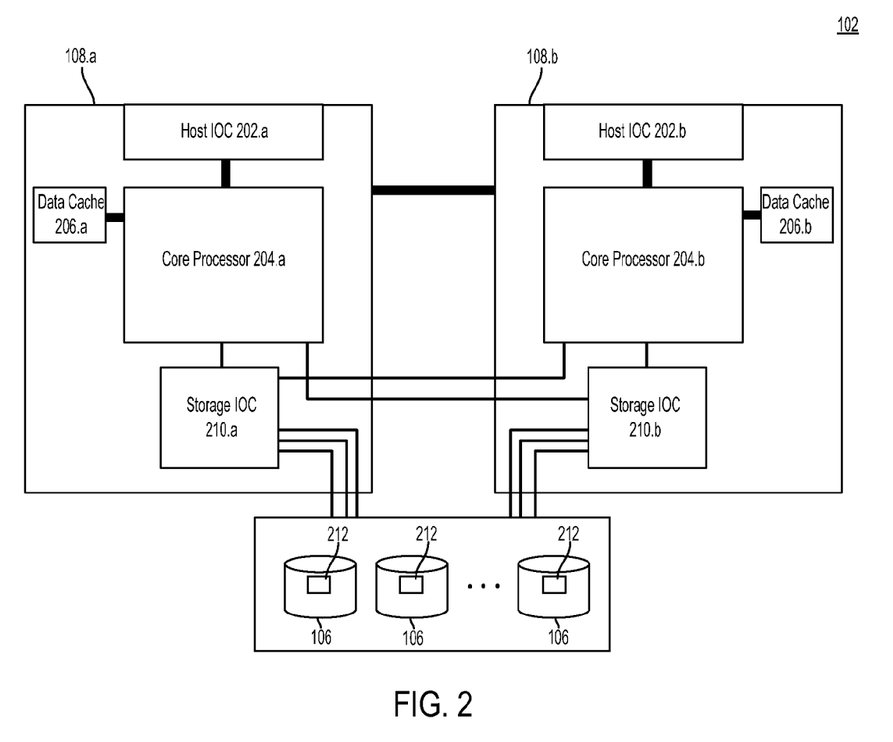
FIG. 2 is an organizational diagram of an exemplary controller architecture according to aspects of the present disclosure.

This is illustrated, for example, in FIG. 2 which is an organizational diagram of an exemplary controller architecture of a storage system 102 according to aspects of the present disclosure. The storage system 102 may include, for example, a first controller 108.a and a second controller 108.b, as well as the storage devices 106. As these are redundant for purposes of failover, the first controller 108.a will be described as representative for purposes of simplicity of discussion.

As shown in FIG. 2, the first controller 108.a may include a host input/output controller (IOC) 202.a, a core processor 204.a, a data cache 206.a, and a storage IOC 210.a. The host IOC 202.a may be connected directly or indirectly to one or more host bus adapters (HBAs) 110 and provide an interface for the storage controller 108.a to communicate with the hosts 104. For example, the host IOC 202.a may operate in a target mode with respect to the host 104. The host IOC 202.a may conform to any suitable hardware and/or software protocol, for example including SAS, iSCSI, Infini-Band, Fibre Channel, and/or FCoE. Other suitable protocols include SATA, eSATA, PATA, USB, and FireWire.

The core processor 204.a may be a microprocessor, a microprocessor core, a microcontroller, an application-specific integrated circuit (ASIC), a central processing unit (CPU), a digital signal processor (DSP), a controller, a field programmable gate array (FPGA) device, another hardware device, a firmware device, or any combination thereof. The core processor 204.a may also be implemented as a combination of computing devices, e.g., a combination of a DSP and a microprocessor, a plurality of microprocessors, one or more microprocessors in conjunction with a DSP core, or any other such configuration.

The data cache 206.a may be a memory device such as random access memory (RAM), magnetoresistive RAM (MRAM), flash memory, solid state memory device, hard disk drives, other forms of volatile and non-volatile memory, or a combination of different types of memory. The data cache 206.a may act as a buffer for I/O operations between the hosts 104 and the storage devices 106. In some embodiments, the data cache 206.a may be battery-backed so that data is not lost during power loss events. The data cache 206.a may be a write-through or a write-back cache, as will be recognized.

The storage IOC 210.a may be connected directly or indirectly to the storage devices 106. The storage IOC 210.a provides an interface for the storage controller 108.a to communicate with the storage devices 106 to write data and read data as requested/needed. For example, the storage IOC 210.a may operate in an initiator mode with respect to the storage devices 106. The storage IOC 210.a may conform to any suitable hardware and/or software protocol, for example including iSCSI, Fibre Channel, FCoE, SMB/CFIS, SAMBA, and NFS.

The storage devices 106 may be HDDs, SSDs, optical drives, and/or any other suitable volatile or non-volatile data storage medium. Each storage device 106 may include a drive controller 212 that, among other features used for reading/writing data or otherwise maintaining the storage device 106, is used for PI.

There are several different scenarios in which PI may be received, checked, and/or generated where PI is enabled depending upon the level of support for PI. For example, in an embodiment PI may be supported end-to-end, from a host 104 to the storage devices 106. In this embodiment, a host 104 that initiates a write request may include the write data together with PI to the storage system 102. The host IOC 202.a may check the write data against the PI upon receipt from the HBA 110. If the check fails, then the host IOC 202.a may request that the host 104 retransmit the request with the write data so that silent data corruption may be avoided. If the check is successful, then the host IOC 202.a may pass the write request along to the core processor 204.a, which may store the write data with PI into a segment of the data cache 206.a associated with the target location of the write.

The write request with the write data and PI is then passed on to the storage IOC 210.a. The storage IOC 210.a may also check the write data against the PI upon receipt, for example to identify any data corruption that may have occurred between the data cache 206.a and the storage IOC 210.a. If the check fails, then the storage IOC 210.a may query the storage controller 108.b to which the data was mirrored. Otherwise, the storage IOC 210.a passes the write request with the write data and PI on to the target storage device(s) 106. At the storage device(s) 106, a drive controller may again check the write data against the PI. If the check fails, then the drive controller may request that the write request with data be resent from the data cache 206.a or the host 104. Otherwise, the drive controller may write the data as requested, for example by way of data and parity update operations, and update/write the PI for the data block to the associated PI block.

In this embodiment, when a read request is sent from the host 104 via the HBA 110, the read request may also identify that PI is requested for the requested data as well. If the requested data is already stored in the data cache 206.a, then the host IOC 202.a may request the data from the data cache 206.a with the PI. The host IOC 202.a may check the read data from the cache against the PI and, if correct, pass the read data with the PI on to the host 104.

If the requested data is not stored in the data cache 206.a already, then the storage system may forward on the request to the storage device(s) 106 where the desired data is located. As the data blocks are read from the storage device(s) 106, the disk controller may check the read data against the associated PI and, if correct, send the read data with the PI to the storage IOC 210.a. When the storage IOC 210.a receives the read data, it may also check the read data against the PI. If the check fails, then the storage IOC 210.a may request the read data again from the storage device(s) 106. Otherwise, the storage IOC 210.a may forward the read data with the PI to the data cache 206.a for storage.

Once the read data with PI is in the data cache 206.a, the host IOC 202.a receives the read data with PI. The host IOC 202.a may again check the read data against the PI and, if the check fails, request the read data again from either the data cache 206.a or the storage device(s) 106. Otherwise, the host IOC 202.a may send the read data and PI on to the HBA 110 of the host 104, where the read data may again be checked against the PI and, if incorrect, requested again.

In another embodiment, PI may be supported at the storage system 102 but not at the host 104. For example, the host 104 may send a write request with write data to the storage system 102 but not PI. In embodiments where PI is already enabled, the storage system 102 may take steps to include and use PI. For example, the host IOC 202.a may receive the write request with write data and generate PI for the data blocks of the write data. The host IOC 202.a may then pass the write request with the write data (and now also PI) to the core processor 204.*a*, which stores the write data, now with PI, to the data cache 206.*a*.

Once the write data, with the PI, is in the data cache 206.*a*, the storage IOC 210.*a* receives the write data with PI and checks the write data against the PI. If the check fails, the storage IOC 210.*a* may request the write data from the storage controller 108.*b* to which the data was mirrored. Otherwise, the write data is sent on to the storage device(s) 106, where drive controllers again check the write data against the PI and either requests the data again if incorrect or write the data, with PI, as requested.

In this other embodiment, when a read request is received from the host 104 that does not also request PI, the requested data may be checked against the corresponding PI by the drive controller and the storage IOC 210.*a* as described with respected the end-to-end embodiment above. When the host IOC 202.*a* receives the requested read data with PI, the host IOC 202.*a* checks and strips the message of the PI so that only the requested read data is sent to the host 104. Where the read data with PI was already stored in the data cache 206.*a*, the host IOC 202.*a* may instead read the data from the cache and check and strip the PI without the read request fully reaching the storage device(s) 106.

The above paragraphs describe how the storage system 102 operates with respect to PI where PI has been previously enabled (e.g., either at time of creation or at some other previous point in time). Certain conditions arise, however, when I/O requests for a specified volume are sent to the storage system 102 while the storage system 102 is actively transitioning the specified volume from PI being disabled to PI being enabled. In these situations, how the storage system 102 treats an I/O request may depend upon where the I/O request falls with respect to an actively executing IAF-PI procedure.

Figure 3:
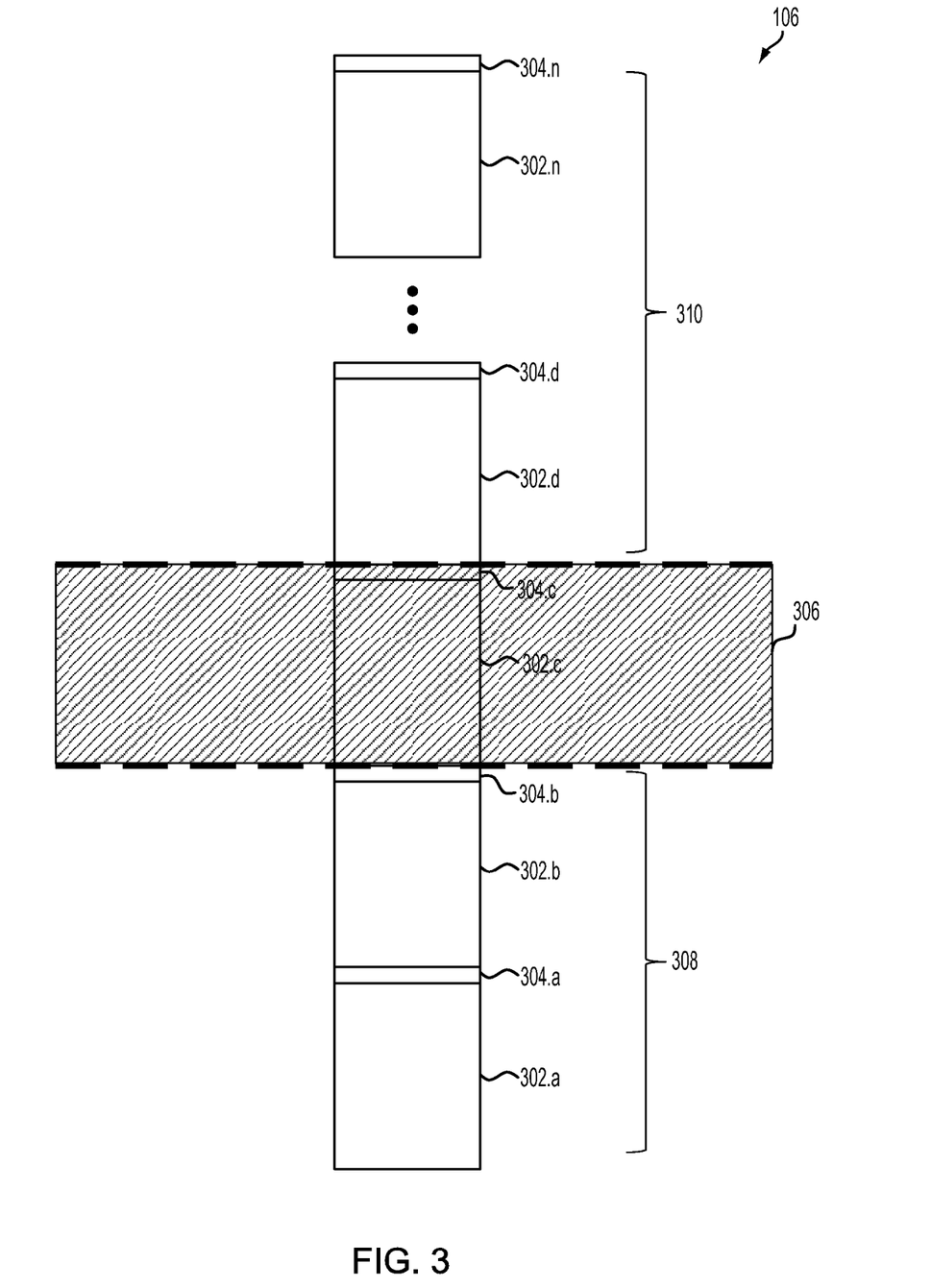
FIG. 3 is an organizational diagram that illustrates a functional boundary during a protection information transition according to aspects of the present disclosure.

Turning now to FIG. 3, an organizational diagram is shown that illustrates a functional IAF-PI boundary during a protection information transition according to aspects of the present disclosure. FIG. 3 illustrates an IAF-PI boundary example with respect to a specific storage device 106 by way of illustration only. The storage device 106 in FIG. 3 is one which is PI capable, and which is being initialized for PI. Illustrated in FIG. 3 is a set of data blocks 302.*a* through 302.*n*, a set of corresponding PI blocks 304.*a* through 304.*n*, an IAF-PI boundary 306, lower regions 308 that fall below the IAF-PI boundary 306, and upper regions 310 that fall above the IAF-PI boundary 306. As will be recognized, FIG. 3 is a simplified diagram for illustrating various aspects of the present disclosure.

Typically, the IAF-PI process is not initiated until the portion of the data cache 206 associated with the specified volume has been synchronized and purged (or concurrent to purging). When the IAF-PI process is initiated, it sweeps through the logical block (LBA) range of the targeted storage devices 106. For example, in response to a PI-enable request (such as from server 114), the storage system 102 may initiate an internal initialization operation. The internal initialization operation updates the protection information on the drives associated with the specified volume, starting from lower LBA values (such as the lowest available for the drives in question) and progressing toward higher LBA values.

For example, the IAF-PI process may start, in FIG. 3, with data block 302.*a* by reading the existing data of the data block 302.*a* from the corresponding storage device 106. After reading the existing data of the data block 302.*a*, the storage IOC 210 computes the correct PI data for the associated data block 302.*a* as the read data flows into the cache 206. The existing data is then re-written to the data block 302.*a* and the correct PI data is written to the associated PI block 304.*a*. As the existing data and correct PI data are written back to the storage device 106, PI data checks occur at the storage IOC 210.*a* and at the storage device 106 before being written. In this manner, PI data is added but the underlying existing data remains unchanged. This same process is repeated at each consecutive block and therefore "sweeps" through the LBA range. As shown in FIG. 3, the IAF-PI process has already finished with data blocks 302.*a* and 302.*b* and is now dealing with the PI block 304.*c* and data block 302.*c*. As such, FIG. 3 illustrates the IAF-PI boundary 306 as currently being at data block 302.*c*.

While the IAF-PI process is sweeping through the LBA range, the storage device 102 is still capable of receiving I/O requests from one or more hosts 104. For example, when a write request is received at the storage system 102 while the IAF-PI process is sweeping through, the storage controller 108 that is handling the write request may determine whether the target IAF-PI process has already swept through the target range of the write. If the write request is to a range that has not undergone the IAF-PI process, then the storage IOC 210 instructs the storage device(s) 106 to perform a full-stripe write with the previously inserted PI. As just one example, in FIG. 3 a write request to a LBA range in data blocks 302.*d* up to 302.*n* are above the IAF-PI boundary 306 and therefore a full-stripe write is performed. As another example, in situations where the host 104 does not write enough data, other blocks of data in the data stripe being written area read out to facilitate a full stripe write. Since this data is stored above the current location of the IAF boundary 306, the PI may be inserted by the storage IOC 210 as the data is read from the other data blocks of the stripe. This may ensure that fully consistent parity and PI for all LBAs are established for the affected stripes, and further maintained when the IAF-PI process works through those stripes.

If the write request is to a range that is currently undergoing the IAF-PI process, then the storage controller 108 may queue the write request until the IAF-PI process has completed with the targeted range. For example, in FIG. 3 a write request to a LBA range in data block 302.*c*, where the boundary 306 currently is, are queued until data block 302.*c* is below the boundary. Once the IAF-PI process is done with that range, the write request is now directed to a range below the IAF-PI boundary 306 and proceeds as follows. If the write request is to a range that has undergone the IAF-PI process, then the storage IOC 210 instructs the storage device(s) 106 to check the PI as it is written to the device together with data and parity update operations, as well as PI update operations according to the RAID level. For example, in FIG. 3 a write request to a LBA range in data blocks 302.*a* and/or 302.*b* are below the IAF-PI boundary 306 and therefore PI is checked and update operations performed as part of the write at the storage device(s) 106.

As another example, when a read request is received at the storage system 102 while the IAF-PI process is sweeping through, the storage controller 108 handling the request may determine whether the IAF-PI process has already swept through the LBA range of the read command. If the read request is to a range that has not undergone the IAF-PI process, then the storage IOC 210 calculates and inserts PI to the data blocks as the data blocks are read from the storage device(s) 106. As just one example, in FIG. 3 a read request to a LBA range in data blocks 302.*c*, 302.*d*, up to 302.*n* are at or above the IAF-PI boundary 306 and therefore PI is inserted as the data blocks are read out into cache 206.

If the read request is to a range that has undergone the IAF-PI process, then the storage IOC 210 instructs the storage device(s) 106 to check the PI as it is read from the device. For example, in FIG. 3 a read request to a LBA range in data blocks 302.*a* and/or 302.*b* are below the IAF-PI boundary 306 and therefore PI is checked as the data blocks are read from the storage device(s) 106. If the read request is to a range that is currently undergoing the IAF-PI process, then the storage controller 108 may queue the read request until the IAF-PI process has completed with the targeted range. Thereafter, the read request is handled as described above with respect to requests directed to ranges below the IAF-PI boundary.

If a storage device 106 fails in a volume group in which a target volume is undergoing the above-described IAF-PI, the IAF-PI process may be preempted to allow reconstruction to occur on all volumes in the volume group. As a particular example, if two storage devices 106 fail in a RAID6 volume group, reconstruction of the volume pieces with two failed storage devices 106 may be given priority over volume pieces with only one failed storage device (e.g., where reconstruction has already partially or completely reconstructed a piece on the storage device). Further, major event logs (MELs) for the IAF-PI that are suspended during this reconstruction after failure and resumed after reconstruction may be posted.

Figure 4:
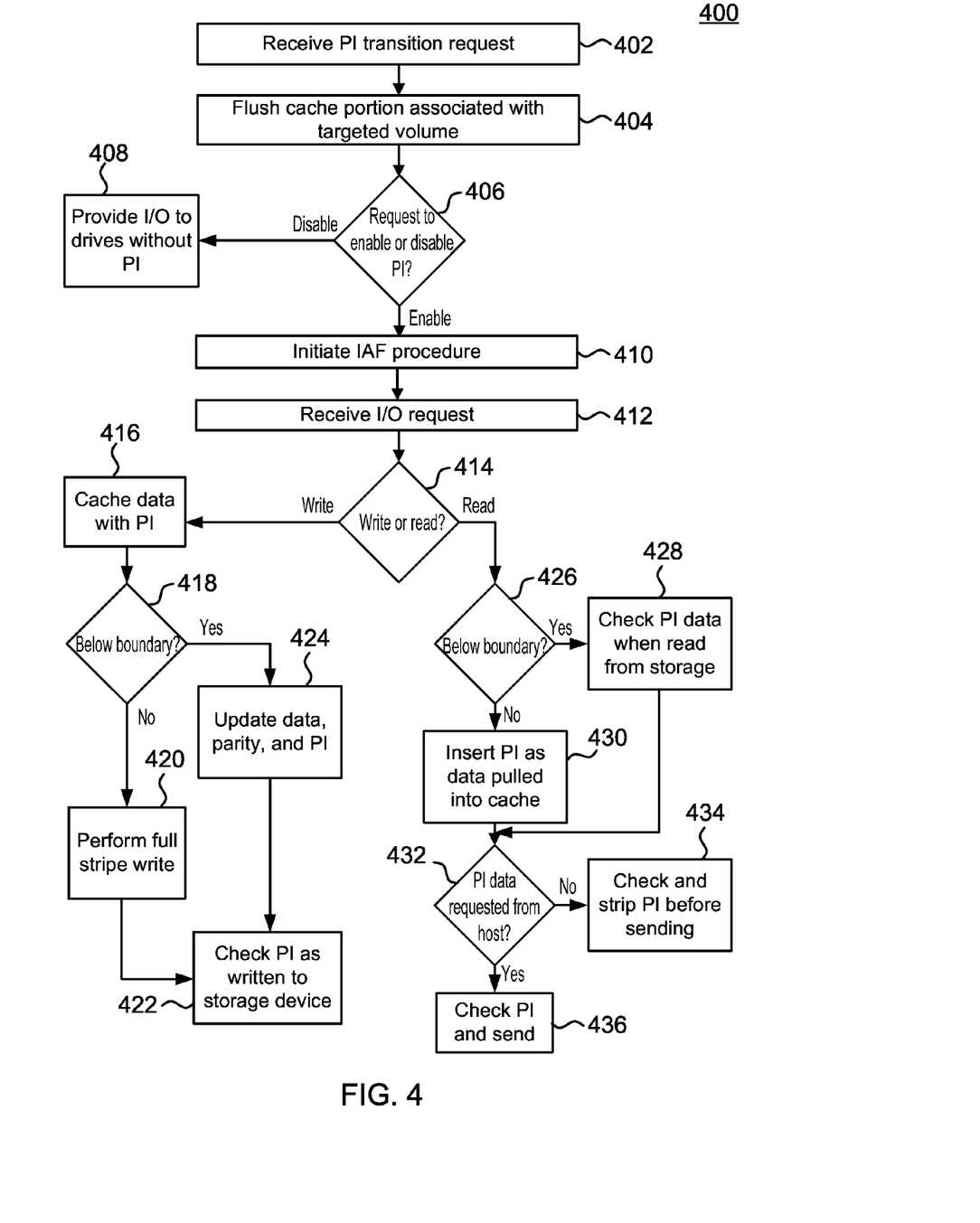
FIG. 4 is a flow diagram of a method of transitioning a protection information status of a volume according to aspects of the present disclosure.

Turning now to FIG. 4, a flow diagram of a method 400 of transitioning a protection information status of a volume is illustrated according to aspects of the present disclosure. In an embodiment, the method 400 may be implemented by one or more processors of one or more of the storage controllers 108 of the storage system 102, executing computer-readable instructions to perform the functions described herein. It is understood that additional steps can be provided before, during, and after the steps of method 400, and that some of the steps described can be replaced or eliminated for other embodiments of the method 400.

At block 402, the storage system 102 receives a PI transition request, for example from the server 114 under the direction of a user. This may be a request to transition from PI being disabled to enabled (a PI enable request) or from enabled to disabled (a PI disable request).

At block 404, the storage controller 108 purges the portion of its cache that is associated with the volume that is the target of the PI transition request. For example, the storage controller 108 may synchronize and purge the portion of its data cache 206 that is associated with the target volume by way of the core processor 204 (in redundant systems, either or both controllers may perform this action). Synchronization (sometimes referred to as "flushing" the cache) may involve writing out any cache data blocks that are dirty (have new data from a host 104 that has not yet been committed to storage device(s) 106). Once the cache data blocks have been synchronized, they may be used to satisfy a read request. Purging (sometimes referred to as "invalidating" the cache) involves marking the cache data blocks as empty, after which they no longer have valid data. If an I/O request is received during this time as the cache is being synchronized and purged, the I/O request may be queued until the operation is complete.

At decision block 406, it is determined whether the PI transition request is a PI enable request or PI disable request. If a PI disable request, then the method 400 proceeds to block 408. At block 408, the storage system 102 provides I/O to/from the various storage devices 106 associated with the target volume without PI. Data during this I/O may be stored in the associated portion of the data cache 206 without PI.

If it is instead determined at decision block 406 that the PI transition request was a PI enable request, then the method 400 proceeds to block 410. At block 410, the storage system 102 initiates an IAF-PI process for the one or more storage devices 106 associated with the target volume of the PI enable request. The IAF-PI process may start at the lowest LBA of the volume and perform an internal reconstruction operation to update the protection information and progress through the LBA values associated with the volume.

At block 412, the storage system 102 receives an I/O request from a host 104 as the IAF-PI process is underway.

At decision block 414, the storage system 102 determines whether the I/O request is a write or read request. If the I/O request is a write request, then the method 400 proceeds to block 416.

At block 416, the storage system 102 caches the write data with PI into the purged cache. The storage system 102 may either check or insert PI when the write request is received at the storage system 102, for example at the host IOC 202. If the host 104 included the PI as part of a PI-enabled request, then the host IOC 202 checks the PI before sending on for caching and writing to storage. If the host 104 did not include PI, then the host IOC 202 inserts the PI before sending on.

Further, as the data is being sent to the storage device(s) 106 to be written, the storage system 102 determines whether the write request is to a LBA range below the current location of the IAF-PI boundary at decision block 418. If it is not to a range below the current location of the IAF-PI boundary, then the method 400 proceeds to block 420. At block 420, the write is made to the LBA range as a full stripe write.

As the write data is sent from the cache, at block 422 the storage IOC 210 checks the PI and the storage device(s) 106 may also check the PI before writing to the media.

Returning to decision block 418, if the write request is to a LBA range below the current location of the IAF-PI boundary, the method 400 proceeds to block 424. At block 424, the requested write is performed as an update of the stored data, the parity information, and the PI. In situations where the write request is directed toward a LBA range that is currently under the IAF-PI process, the storage system 102 may queue the write request until the IAF-PI process has passed on and then proceed according to block 424.

The method 400 continues at block 422 where, as described above, the storage IOC 210 checks the PI and the storage device(s) 106 check the PI before updating on the media.

Returning now to decision block 414, if the I/O request is a read request, then the method 400 proceeds to decision block 426. At decision block 426, the storage system 102 determines whether the read request is to a LBA range below the current location of the IAF-PI boundary. If below, then the method 400 proceeds to block 428.

At block 428, the storage system 102 checks the PI for the data blocks in the requested LBA ranges as they are read from the storage devices 106. For example, the storage device 106 may check the PI, and then again at the storage IOC 210 before the read data is stored in the data cache 206.

The method 400 then proceeds, from block 428, to decision block 432. At decision block 432, the storage system 102 determines whether the host 104 that originated the read request had indicated PI should be included as well. For example, the storage controller 102 may make this determination based on the value stored in a field of the read request, such as a RDPROTECT field. If the host 104 has not requested that PI be included, then the method 400 proceeds to block 434 where the host IOC 202 checks and strips the PI data from the requested read data before sending the requested read data on to the host 104.

If the host 104 has requested PI data be included, then the method 400 proceeds to block 436 where the host IOC 202 further checks the PI before sending the data with PI on to the host 104 to complete the read request.

Returning to decision block 426, if the storage system 102 determines that the read request is to a LBA range at or above the current location of the IAF-PI boundary, then the method 400 proceeds to block 430.

At block 430, the PI is inserted with the data as the data is read from the requested LBAs. In an embodiment, the storage IOC 210 may insert the PI as the data is received from the storage device(s) 106. In situations where the read request is directed toward a LBA range that is currently under the IAF-PI process, the storage system 102 may queue the read request until the IAF-PI process has passed on and then proceed according to block 430. After the PI is inserted with the data, the data and PI are passed on and stored in the data cache 206 before being checked again (and stripped, where appropriate) at the host IOC 202. After the PI is inserted, the method 400 proceeds to decision block 432 and beyond as described above.

By utilizing the IAF-PI process and handling conditions described above, the process of transitioning between PI states (e.g., disabled to enabled) may remain a faster, online process that does not require downtime (such as to back up data and restore the data offline as previously done). As a result, the operation of the computing system of storage system 102 is improved with more efficient transitioning that does not require downtime.

The present embodiments can take the form of an entirely hardware embodiment, an entirely software embodiment, or an embodiment containing both hardware and software elements. In that regard, in some embodiments, the computing system is programmable and is programmed to execute processes including those associated with providing an elastic snapshot repository such as the processes of methods 400, 500, and/or 600 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides system, methods, and computer-readable media for performing a method of transitioning a protection information (PI) status of a designated volume. In some embodiments, the method includes receiving, at a storage controller, a protection information (PI) enable request for a designated volume that has PI disabled, wherein the volume comprises one or more underlying storage devices that are PI capable; purging, by the storage controller, a portion of a cache associated with the designated volume in response to the PI enable request; and initializing, by the storage controller, PI for data blocks of the one or more underlying storage devices by working through the data blocks and generating and storing the PI associated with the data blocks.

In further embodiments, the computing device includes a memory containing machine readable medium comprising machine executable code having stored thereon instructions for performing a method of transitioning a protection information (PI) status of a designated volume; one or more storage devices associated with the designated volume that are PI capable; and a processor coupled to the memory and a cache. The processor is configured to execute the machine executable code to receive a PI enable request for the designated volume while the designated volume has PI disabled; purge a portion of the cache associated with the designated volume in response to the PI enable request; and generate PI associated with data blocks of the one or more storage devices, the generated PI being stored in association with the data blocks.

In yet further embodiments a non-transitory machine readable medium having stored thereon instructions for performing a method of transitioning a protection information (PI) status of a designated volume comprises machine executable code. When executed by at least one machine, the code causes the machine to receive a PI enable request for the designated volume while the designated volume has PI disabled, wherein the volume comprises one or more underlying storage devices that are PI capable; synchronize and invalidate a portion of a cache associated with the designated volume in response to the PI enable request; and initiate an immediate availability function (IAF-PI) procedure on the one or more underlying storage devices, the IAF-PI procedure sweeping through data blocks corresponding to the designated volume and generating and storing PI associated with the data blocks during the sweep.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   receiving, at a storage controller, a protection information (PI) enable request for a designated volume that has PI disabled, wherein the volume comprises one or more underlying storage devices that are PI capable;
   purging, by the storage controller, a portion of a cache associated with the designated volume in response to the PI enable request;
   initializing, by the storage controller with an immediate availability function (IAF-PI) procedure, PI for data blocks of the one or more underlying storage devices by working through the data blocks and generating the PI associated with the data blocks;
   appending, by the storage controller, the PI to the data blocks in the same designated volume of the one or more underlying storage devices, wherein the PI comprises error checking information for the data blocks;
   receiving, during the IAF-PI procedure, an input/output request from a host; and determining, in response to the input/output request, to process the input/output request based on a target location of the input/output request on both first and second sides of an IAF boundary of the IAF-PI procedure, the IAF boundary dividing the first side including unprocessed data blocks and the second side including processed data blocks.

2. The method of claim 1, further comprising:
storing, in the portion of the cache, a result of the input/output request with associated PI.

3. The method of claim 2, wherein the input/output request comprises a read request, the method further comprising:
inserting PI for data blocks associated with the target location in response to determining that the target location is to the first side of the IAF boundary; and
checking the PI for the data blocks associated with the target location in response to determining that the target location is to the second side of the IAF boundary.

4. The method of claim 3, wherein the storage controller comprises a first input/output controller coupled to the host and a second input/output controller coupled to the one or more underlying storage devices, the second input/output controller performing the checking, the method further comprising:
checking, at the first input/output controller, the PI for the data blocks provided from the one or more underlying storage devices if the host requested the data blocks with PI; and
stripping, at the first input/output controller after checking the PI, the PI from the data blocks provided from the one or more underlying storage devices if the host did not request the data blocks with PI.

5. The method of claim 2, wherein the input/output request comprises a write request, the method further comprising:
inserting PI for data blocks associated with the target location regardless of which side of the IAF boundary the write request is directed towards if the host did not provide the PI with the write request; and
checking the PI if the host did provide the PI with the write request.

6. The method of claim 1, further comprising:
receiving, at the storage controller, a PI disable request for the designated volume;
purging, in response to the PI disable request, the portion of the cache associated with the designated volume; and
providing, after the purging, input/output requests to the designated volume without PI included or requested.

7. A computing device, comprising:
a memory containing machine readable medium comprising machine executable code having stored thereon instructions for performing a method of transitioning a protection information (PI) status of a designated volume;
one or more storage devices associated with the designated volume that are PI capable; and
a processor coupled to the memory and a cache, the processor configured to execute the machine executable code to:
receive a PI enable request for the designated volume while the designated volume has PI disabled;
purge a portion of the cache associated with the designated volume in response to the PI enable request;
generate PI associated with data blocks of the one or more storage devices;
append the generated PI to the data blocks in the same designated volume of the one or more storage devices for storage in association with the data blocks, wherein the PI comprises error checking information for the data blocks;
receive, during the generation, an input/output request from a host; and
determine, in response to the input/output request, to process the input/output request based on a target location of the input/output request on both first and second sides of a boundary marking a level of completion of the generation, the boundary dividing the first side including unprocessed data blocks and the second side including processed data blocks.

8. The computing device of claim 7, wherein the processor is further configured to:
store, in the portion of the cache, a result of the input/output request with associated PI.

9. The computing device of claim 7, wherein the input/output request comprises a read request, the processor being further configured to:
insert PI for data blocks associated with the target location in response to determining that the target location is to the first side of the boundary; and
check the PI for the data blocks associated with the target location in response to determining that the target location is to the second side of the boundary.

10. The computing device of claim 9, further comprising:
an input/output controller coupled to the host and configured to:
check the PI for the data blocks provided from the one or more underlying storage devices before sending on to the host if the host requested the data blocks with PI; and
strip, after a check of the PI, the PI from the data blocks provided from the one or more underlying storage devices before sending on to the host if the host did not request the data blocks with PI.

11. The computing device of claim 7, wherein the input/output request comprises a write request, the processor being further configured to:
insert PI for data blocks associated with the target location regardless of which side of the boundary the write request is directed towards if the host did not provide the PI with the write request; and
check the PI if the host did provide the PI with the write request.

12. The computing device of claim 7, wherein the processor is further configured to:
receive a PI disable request for the designated volume;
purge, in response to the PI disable request, the portion of the cache associated with the designated volume; and
provide, after the purge, input/output requests to the designated volume without PI included or requested.

13. A non-transitory machine readable medium having stored thereon instructions for performing a method of transitioning a protection information (PI) status of a designated volume, comprising machine executable code which when executed by at least one machine, causes the machine to:
receive a PI enable request for the designated volume while the designated volume has PI disabled, wherein the volume comprises one or more underlying storage devices that are PI capable;
synchronize and invalidate a portion of a cache associated with the designated volume in response to the PI enable request;

initiate an immediate availability function (IAF-PI) procedure on the one or more underlying storage devices, the IAF-PI procedure sweeping through data blocks corresponding to the designated volume and generating PI associated with the data blocks during the sweep;

append the PI to the data blocks in the same designated volume of the one or more underlying storage devices, wherein the PI comprises error checking information for the data blocks;

receive, during the IAF-PI procedure, an input/output request from a host; and determine, in response to the input/output request, to process the input/output request based on a target location of the input/output request on both first and second sides of an IAF boundary of the IAF-PI procedure, the IAF boundary dividing the first side including unprocessed data blocks and the second side including processed data blocks.

14. The non-transitory machine readable medium of claim 13, comprising further machine executable code that causes the machine to:

store, in the portion of the cache, a result of the input/output request with associated PI.

15. The non-transitory machine readable medium of claim 14, wherein the input/output request comprises a read request, comprising further machine executable code that causes the machine to:

insert PI for data blocks associated with the target location before storing in the portion of the cache in response to determining that the target location is to the first side of the IAF boundary; and check the PI for the data blocks associated with the target location before storing in the portion of the cache in response to determining that the target location is to the second side of the IAF boundary.

16. The non-transitory machine readable medium of claim 15, comprising further machine executable code that causes the machine to:

check the PI for the data blocks provided from the one or more underlying storage devices before sending on to the host if the host requested the data blocks with PI; and strip, after a check of the PI, the PI from the data blocks provided from the one or more underlying storage devices before sending on to the host if the host did not request the data blocks with PI.

17. The non-transitory machine readable medium of claim 14, wherein the input/output request comprises a write request, comprising further machine executable code that causes the machine to:

insert PI for data blocks associated with the target location regardless of which side of the IAF boundary the write request is directed towards if the host did not provide the PI with the write request; and check the PI if the host did provide the PI with the write request.

18. The non-transitory machine readable medium of claim 13, comprising further machine executable code that causes the machine to:

receive a PI disable request for the designated volume;

synchronize and invalidate, in response to the PI disable request, the portion of the cache associated with the designated volume; and provide, after the synchronization and invalidation, input/output requests to the designated volume without PI included or requested.

\* \* \* \* \*